United States Patent
Hales (10) Patent No.: US 9,855,564 B2
(45) Date of Patent: Jan. 2, 2018

(54) DEVICES AND METHODS FOR REMOVING FERROMAGNETIC PARTICLES FROM A LIQUID

(71) Applicant: MagSolutions, LLC, Durham, NC (US)

(72) Inventor: Robert Norman Hales, Durham, NC (US)

(73) Assignee: MagSolutions, LLC, Durham, NC (US)

( * ) Notice: Subject to any disclaimer, the term of this patent is extended or adjusted under 35 U.S.C. 154(b) by 421 days.

(21) Appl. No.: 14/703,037

(22) Filed: May 4, 2015

(65) Prior Publication Data

US 2015/0321199 A1  Nov. 12, 2015

Related U.S. Application Data

(60) Provisional application No. 61/989,342, filed on May 6, 2014.

(51) Int. Cl.
| | |
|---|---|
| *B03C 1/02* | (2006.01) |
| *B03C 1/033* | (2006.01) |
| *B01D 35/06* | (2006.01) |
| *B03C 1/00* | (2006.01) |
| *B03C 1/12* | (2006.01) |
| *C02F 1/48* | (2006.01) |

(52) U.S. Cl.
CPC ............ *B03C 1/0332* (2013.01); *B01D 35/06* (2013.01); *B03C 1/002* (2013.01); *B03C 1/02* (2013.01); *B03C 1/12* (2013.01); *B03C 2201/18* (2013.01); *C02F 1/482* (2013.01); *C02F 1/488* (2013.01)

(58) Field of Classification Search
CPC ....... B01D 35/06; B03C 1/02; B03C 2201/18; B03C 1/0332; C02F 1/481; C02F 1/482; C02F 1/488
USPC .................................................. 210/222, 695
See application file for complete search history.

(56) References Cited

U.S. PATENT DOCUMENTS

| | | | | |
|---|---|---|---|---|
| 2,376,535 A | * | 5/1945 | Fisher .................... | B01D 33/06 204/560 |
| 3,474,904 A | * | 10/1969 | Goulstone ............... | B03C 1/035 209/3.2 |
| 3,834,539 A | * | 9/1974 | Thompson ............. | B01D 35/02 210/167.32 |
| 3,998,741 A | * | 12/1976 | Councell .................. | B03C 1/12 209/222 |
| 2009/0211992 A1 | * | 8/2009 | Saho ..................... | B01D 33/073 210/791 |
| 2014/0367339 A1 | * | 12/2014 | Awadalla .................. | B03C 1/18 210/695 |

* cited by examiner

Primary Examiner — Robert Clemente
(74) Attorney, Agent, or Firm — Coats & Bennett, PLLC (57) ABSTRACT

Devices and methods to remove ferromagnetic particles from a liquid. The device generally includes a container that may include an inlet for the introduction of the liquid and ferromagnetic materials and an outlet from which the cleaned liquid flows from the container. A magnet may be positioned in the container and is configured to attract the ferromagnetic materials. The magnet may be further configured to move and to release the materials into a collection basin. The ferromagnetic material may be removed from the collection basin with the cleaned liquid being moved through the outlet.

19 Claims, 6 Drawing Sheets

DEVICES AND METHODS FOR REMOVING FERROMAGNETIC PARTICLES FROM A LIQUID

RELATED APPLICATIONS

This application claims the benefit of U.S. Provisional Application No. 61/989,342 filed May 6, 2014, which is hereby incorporated by reference in its entirety.

BACKGROUND

Liquids, such as water, are used in steel production facilities for a variety of reasons including removing impurities from the steel and as a coolant that regulates the steel's temperature. Liquids may also be used in various other industrial facilities, such as a coolant during cutting or shaping of various metallic parts. In the various contexts, ferromagnetic material, such as small fragments, particles, scrap, etc. are carried by the liquid. These relatively small ferromagnetic materials are referred to herein as ferromagnetic particles.

The ferromagnetic material should be removed from the liquid for various reasons. First, the materials may be recycled and formed into a useful product. Second, the materials should be removed from the liquid such that the liquid can be output from the industrial facility. For example, water used as a coolant during steel production may be cleaned and returned to a river or lake.

SUMMARY

The present application is directed to devices and methods for removing ferromagnetic materials from liquid. The devices and methods use a magnet that applies a magnetic force to the liquid to attract and remove the ferromagnetic materials.

One embodiment is directed to a device to remove ferromagnetic particles from a liquid. The device includes a container to hold the liquid as the liquid moves in a horizontal downstream direction. The container includes a channel with a floor and a collection basin. The collection basin has a bottom positioned vertically below the floor. The floor includes a first section located upstream from the collection basin and a second section located downstream from the collection basin. The device also includes a magnet positioned along the first section and vertically above the bottom of the collection basin. The magnet includes a body that extends across the channel and magnet rows that extend along the body and are spaced apart around a periphery of the body. The magnet is isolated from the ferromagnetic particles by the floor of the first section. The body is rotatable relative to the floor of the first section such that each of the magnet rows faces towards the channel for a limited time during a full rotation of the body.

The device may also include a receptacle positioned along the first section and that includes an interior space that houses the magnet. The receptacle may be positioned vertically above the bottom of the collection basin. The receptacle may extend completely around and enclose the magnet.

The floor of the first section may be is formed by a first portion that extends inward from an inlet and a wall of the receptacle.

The body may vertically overlap with the bottom of the collection basin.

The device may include a motor operatively connected to the magnet to rotate the magnet.

The magnet rows may extend along an entirety of the length of the body.

The device may include a baffle positioned downstream along the channel from the collection basin. The baffle may extend vertically above the floor of the second section.

The container may include an inlet upstream from the first section, and a plate that extends along the first section that is positioned vertically above the inlet and the floor of the first section.

A downstream edge of the magnet may be positioned at the collection basin such that the ferromagnetic particles attracted to the magnet fall into the collection basin during rotation of the magnet.

Another embodiment is directed to a device to remove ferromagnetic particles from a liquid. The device includes a container to hold the liquid as the liquid moves in a horizontal downstream direction through the container. The container includes a collection basin with a bottom. The container also includes a first section located horizontally upstream from the collection basin, a second section located horizontally downstream from the collection basin, and an attraction zone located horizontally between the first section and the collection basin. Each of the first section, the second section, and the attraction zone include floors that are vertically above the bottom of the collection basin. A magnet is positioned at the attraction zone and vertically above the bottom of the collection basin. The magnet includes a body with magnet rows that extend along the body and are spaced apart around a periphery of the body. The magnet is isolated from the ferromagnetic particles by a wall. The magnet is rotatable such that each of the magnet rows faces towards the channel for a limited time during a full rotation of the body. A downstream edge of the magnet is positioned at the collection basin such that the ferromagnetic particles on the wall fall into the collection basin during rotation of the magnet.

The device may also include a receptacle with an interior space that houses the magnet with the wall forming a portion of a receptacle.

The collection basin may include upstream and downstream sidewalls that are horizontally spaced apart with the downstream edge of the magnet positioned horizontally between the upstream and downstream sidewalls.

At least a portion of the floor of the attraction zone may be vertically above the floor of the first section.

Another embodiment is directed to a method of removing ferromagnetic particles from a liquid. The method includes moving the liquid with the ferromagnetic particles along a channel of a container. While the liquid and the ferromagnetic particles are moving along the channel, magnetically attracting the ferromagnetic particles towards a magnet and against a wall that separates the magnet from the channel. The method includes moving the magnet causing the ferromagnetic particles that are magnetically attracted to the magnet to follow the magnet and move along the wall and vertically over a collection basin. The method includes moving the magnet away from the ferromagnetic particles and removing the magnetic attraction between the magnet and the ferromagnetic particles thereby causing the ferromagnetic particles to vertically fall into the collection basin.

The method may also include magnetically attracting the ferromagnetic particles towards a bottom of the channel.

The method may include preventing the ferromagnetic materials from directly contacting the magnet.

The method may include that moving the magnet includes rotating the magnet.

The method may include moving the liquid along the channel while the ferromagnetic materials are being magnetically attracted towards the magnet and while the ferromagnetic particles are vertically falling into the collection basin.

One embodiment is directed to a device that includes a container configured to contain the liquid. The container includes a floor with a collection basin, a first section located upstream from the collection basin and a second section located downstream from the collection basin. The collection basin is vertically below the first and second sections. A receptacle is positioned upstream from the collection basin and is vertically above the collection basin. The receptacle includes a hollow interior that is surround by an exterior wall. A magnet is rotatably positioned within the receptacle and includes a body with a plurality of rows of magnets that extend along the length of the body and are spaced apart around the perimeter of the body.

The first section may be located upstream from the receptacle and may be aligned at an angle of between 0°-10° with a first end away from the receptacle being higher than an opposing second end.

The receptacle may be positioned along a vertical wall of the collection basin.

The body may have a circular cross-sectional shape.

The device may also include a plate that extends vertically above the first section and the receptacle to direct the liquid and the ferromagnetic materials towards the magnet.

Another embodiment is directed to a method of removing ferromagnetic materials from a liquid. The method includes inputting the liquid that includes the ferromagnetic materials into an inlet of a container, moving the liquid with the ferromagnetic materials over a magnet while the magnet is rotating and the magnet producing a magnetic field; attracting the ferromagnetic materials with the magnetic field from the liquid and into proximity with the magnet; moving the attracted ferromagnetic materials along a contact surface in proximity to the magnet due to rotation of the magnet; and rotating the magnet an additional amount such that the magnetic field moves away from the attracted ferromagnetic materials thus causing the ferromagnetic materials to fall due to gravity from proximity to the magnet and into a collection basin.

The method may also include attracting a portion of the ferromagnetic materials to each of a plurality of magnet rows that extend along the magnet.

The various aspects of the various embodiments may be used alone or in any combination, as is desired.

DETAILED DESCRIPTION

The present application is directed to devices and methods to remove ferromagnetic materials from a liquid. The device generally includes a container configured to contain the liquid. The container includes an inlet for the introduction of the liquid and ferromagnetic materials and an outlet from which the cleaned liquid flows from the container. A magnet is positioned in the container and is configured to attract the ferromagnetic materials from the liquid. The magnet is further configured to rotate and to release the materials into a collection basin. The ferromagnetic material may be removed from the collection basin with the cleaned liquid being moved through the outlet.

The liquid may include one or more types of ferromagnetic materials. These materials are magnetically attracted to the magnet when moved within its magnetic field. The materials may include various shapes and sizes. The materials may be formed during a production process (e.g., a steel making process), during a cutting, drilling, or forming process, and various other industrial processes. The liquid may be used during the industrial process for various reasons, such as but not limited to a coolant, a lubricant, and other. Various types of liquid may be used, including but not limited to water, various industrial lubricants, various mining and industrial waste streams, and combinations thereof.

Figure 1:
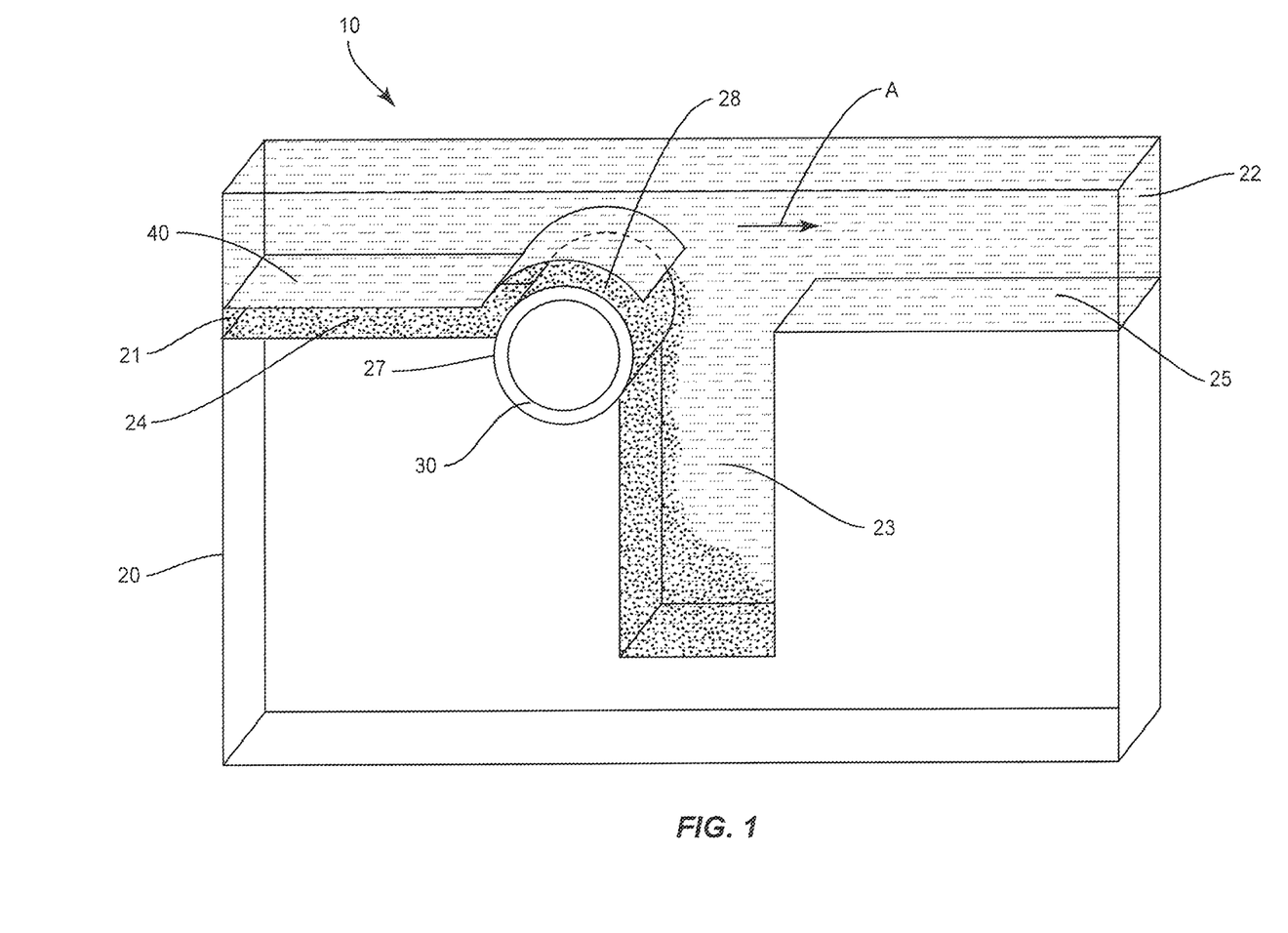
FIG. 1 is a perspective schematic view of a device with walls of a container removed for viewing the liquid and the particles.
Figure 2:
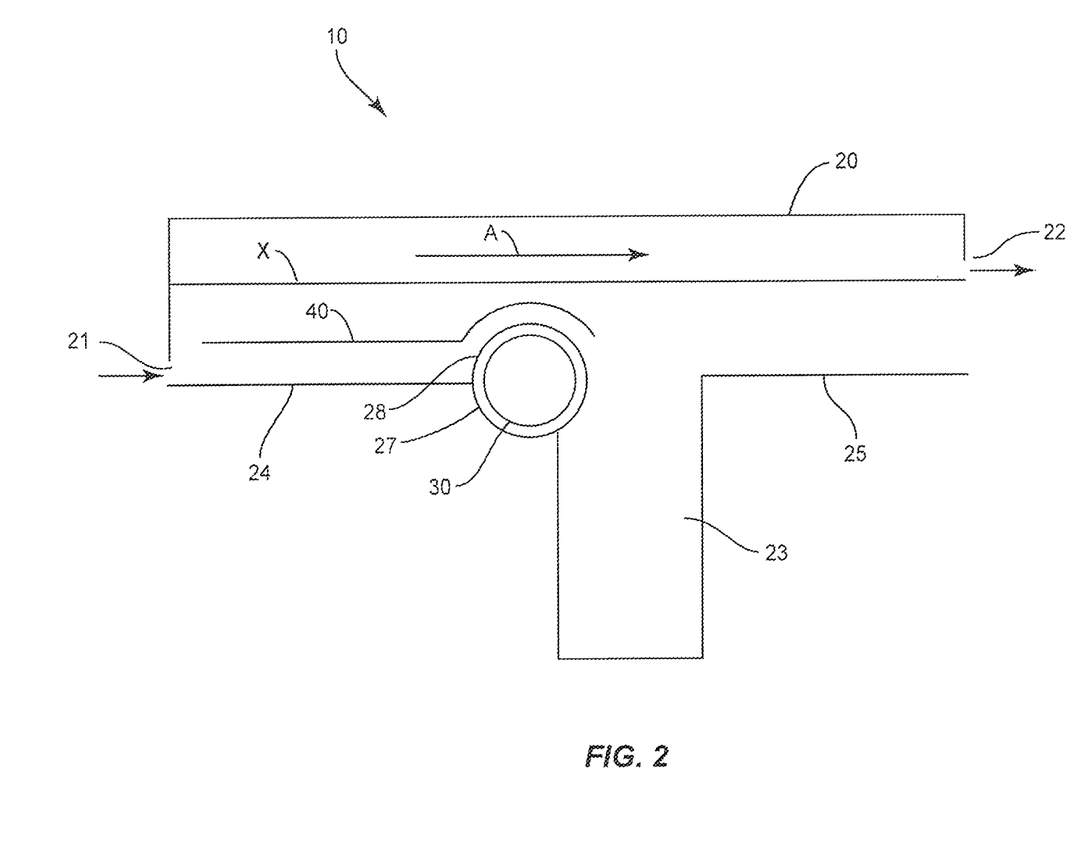
FIG. 2 is a schematic side view of the device of FIG. 1.

FIG. 1 illustrates a perspective view of a device 10, and FIG. 2 illustrates a schematic side view of the device 10. A container 20 is configured to contain the liquid and the ferromagnetic materials. The container 20 may include an elongated length arranged in a horizontal orientation that includes an inlet 21 at a first end and an outlet 22 at a second end. Lateral sides extend between the ends. FIG. 1 includes a front lateral side removed for clarity. The liquid generally flows through the container 20 in the direction of arrow A from the upstream inlet 21 to the downstream outlet 22.

A receptacle 27 is formed in the container 20 to hold the magnet 30. The receptacle 27 is sized to receive the magnet 30 and allow for rotation of the magnet 30. In one or more embodiments, the receptacle 27 is a cylindrical tube that includes an outer wall 28. The receptacle 27 forms a rounded hump within the container 27.

The container 20 also includes a first section 24 that leads from the inlet 21 to the receptacle 27 that holds the magnet 30 and a second section 25 downstream from a collection basin 23 and upstream from the outlet 22. The collection basin 23 is positioned downstream from the receptacle 27 that holds the magnet 30. The collection basin 23 provides an area for the ferromagnetic materials to collect after being released from the magnet 30. The collection basin 23 is positioned vertically below the level of the magnet 30 to provide for the force of gravity to assist in removing the ferromagnetic materials. The magnet 30 may vertically overlap with the collection basin 23 as illustrated in FIGS. 1, 2, 3, 4, and 8. This includes a downstream portion of the magnet 30 extending over the collection basin 23. The collection basin 23 may extend various depths below the magnet 30, and may have a variety of lengths.

Figure 3:
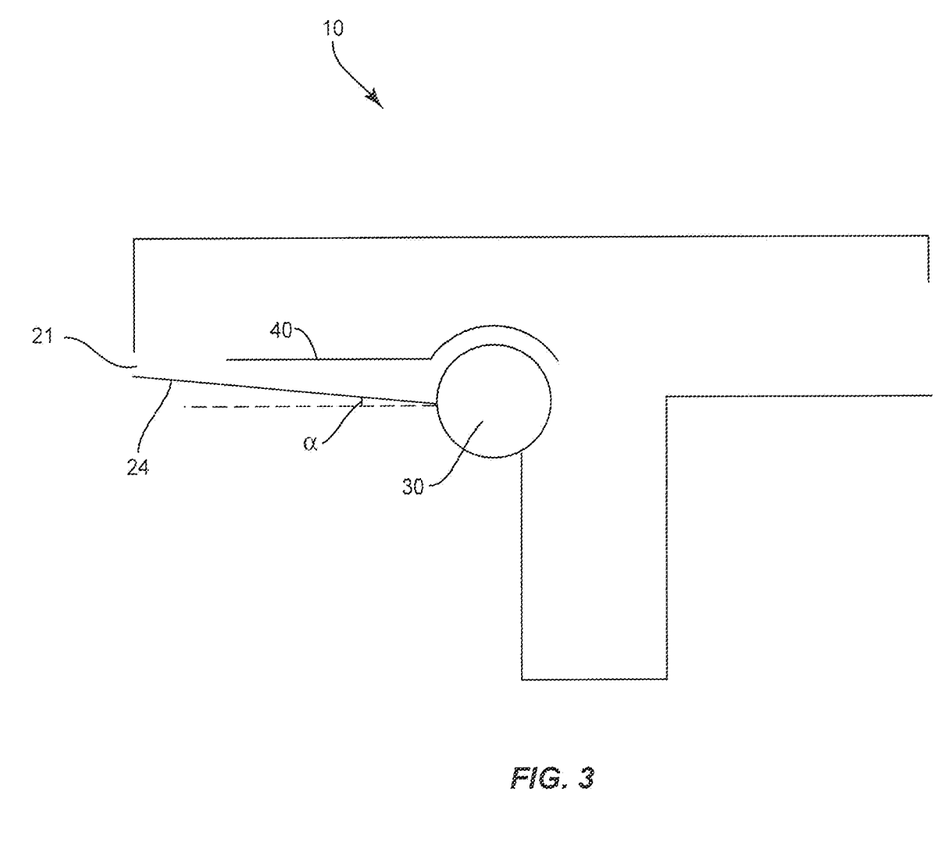
FIG. 3 is a schematic side view of a device with a first section elevated at an angle.

In one embodiment as illustrated in FIGS. 1 and 2, the first section 24 of the container 20 that extends from the inlet 21 to the receptacle 27 includes a first end at the inlet 21 being at substantially the same vertical height as an opposing second end at the magnet 30. In other embodiments as illustrated in FIG. 3, the first section 24 is positioned at an angle α with the first end being vertically higher than the second end. This ramped configuration aids the movement of the ferromagnetic materials that fall out of the liquid towards the magnet 30. Material that has fallen out of the liquid and accumulates on the bottom of the container 20 is moved towards the magnet due to gravity and the movement of the liquid. In one or more embodiments, the angle α of the first section 24 may range from 1°-10°.

A plate 40 may extend over a portion or entirety of the first section 24 and/or magnet 30. The plate 40 functions to direct the liquid with the ferromagnetic materials that is introduced through the inlet 21 to move in proximity of the magnet 30. The proximity is within the magnetic field of the magnet 30 such that the ferromagnetic material is attracted and removed from the liquid. A downstream end of the plate 40 may include a curved shape that extends around a portion of the receptacle 27.

In one or more embodiments as illustrated in FIG. 2, the level X of the liquid in the container 20 may be above the plate 40. Therefore, the plate 40 just directs the liquid and ferromagnetic materials to initially move in proximity to the magnet 30.

Figure 4:
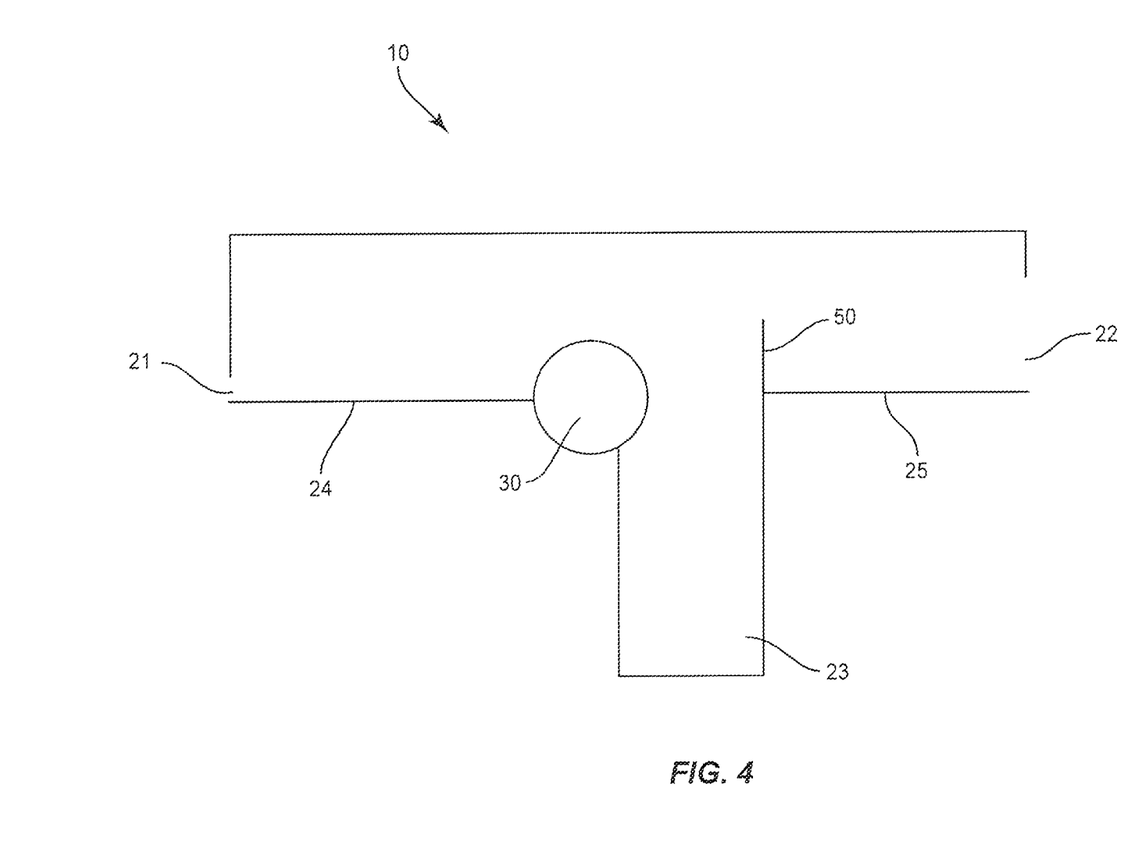
FIG. 4 is a schematic side view of a device with a baffle positioned downstream from the collection basin.

A baffle 50 may be positioned downstream from the collection basin 23 as illustrated in FIG. 4. In one embodiment, the baffle 50 is positioned immediately downstream from the collection basin 23. Other embodiments may position the baffle 50 at various locations along the second section 25. The baffle 50 assists in maintaining the ferromagnetic materials in the collection basin 23. The baffle 50 may prevent or reduce agitation of the liquid thus preventing or reducing the materials from becoming stirred back into the liquid and removed from the container 20 through the outlet 22. The height of the baffle 50 may vary, with one embodiment including the baffle extending vertically above the top of the magnet 30 and the receptacle 27.

Figure 5:
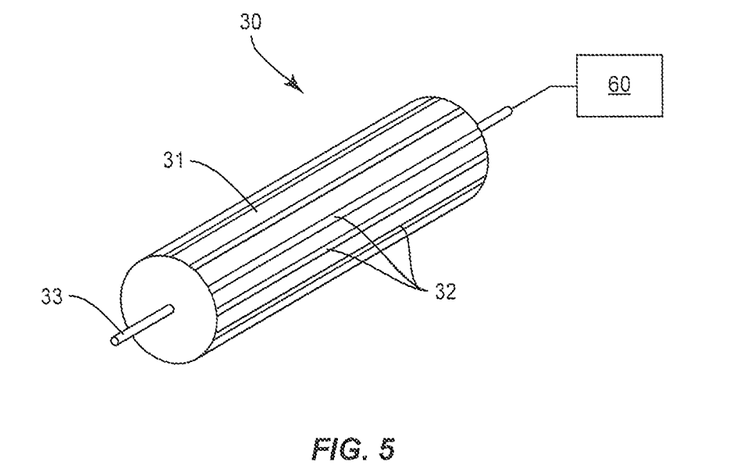
FIG. 5 is a perspective schematic view of a magnet and an operatively connected motor.

The magnet 30 is configured to create one or more magnetic fields to attract the ferromagnetic materials from the liquid. FIG. 5 illustrates one embodiment of a magnet 30 that includes a generally cylindrical body 31. Rows 32 of magnets extend across the length of the body 31. The rows 32 are spaced apart around the perimeter of the body 31. Each of the rows 32 is constructed of a magnetic material that produces a magnetic field that attracts the ferromagnetic material. In one or more embodiments, the body 31 includes a circular cross-sectional shape. Other embodiments may include different shapes.

The body 31 is supported on an axle 33 that mounts to the container 20. One or more motors 60 are configured to rotate the magnet 30 at the desired speeds. The one or more motors 60 may be positioned on the outside of the container 20, or at least outside of the receptacle 27 in which the body 31 is positioned.

Figure 6:
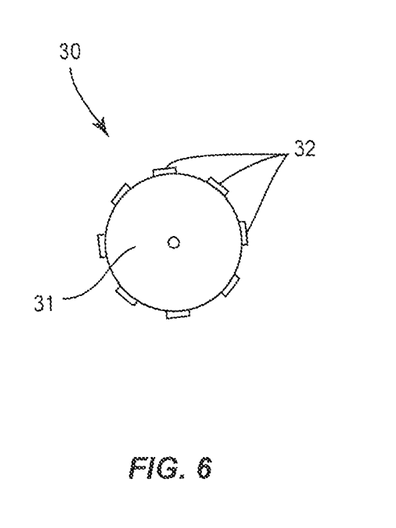
FIG. 6 is an end view of a magnet.

FIG. 6 illustrates a side view of the magnet 30 that includes the body 31 and the magnet rows 32. In this embodiment, each of the rows 32 is attached to an outer perimeter of the body 31. In one or more other embodiments, the rows 32 are positioned within recesses formed in the body 31. In one or more embodiments, the rows 32 are straight along the length of the body 31. Other embodiments may include the rows 32 having different configurations. The rows 32 may extend across an entirety of the body length, or a limited amount less than the length of the body 31.

Figure 7:
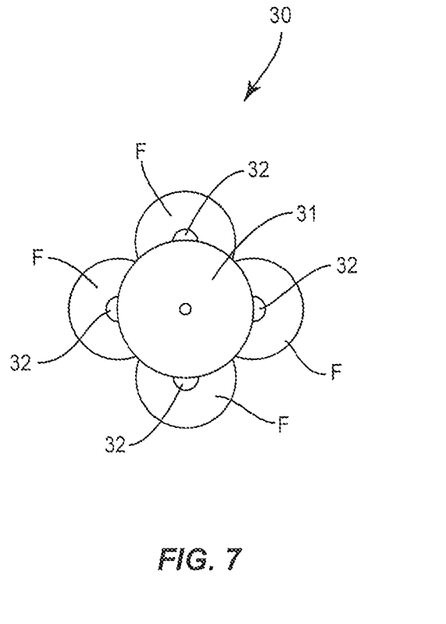
FIG. 7 is a schematic end view of a magnet with magnetic fields produced by the magnet rows.

The magnet rows 32 are spaced apart around the body 31. In one embodiment, each of the rows 32 is positioned such that the magnetic field produced by the row 32 does not interfere with the other rows 32. This spacing also provides for the ferromagnetic material to be released by the magnet 30 during rotation within the receptacle 27 as will be explained in detail below. FIG. 7 schematically illustrates one embodiment of the placement of the rows 32 about the body 31. Each of the magnet rows 32 produces a magnetic field F that provides a force to attract the ferromagnetic material. The magnet rows 32 are spaced around the perimeter of the body 31 such that the fields F extend around the entire body 31. This spacing provides for the magnet 30 to attract the ferromagnetic materials at each rotational position of the magnet 30 within the receptacle 27. Further, the rows 32 are spaced apart an amount such that the fields F do not interfere with one another.

In one or more embodiments, each of the magnet rows 32 is substantially the same and produces substantially the same magnetic field F. The rows 32 are equally spaced around the perimeter of the body 31. In one or more other embodiments, one or more of the magnet rows 32 are different and produce a different magnetic field F. In these embodiments, the rows 32 may be unequally spaced around the perimeter of the body 31.

The magnet 30 is sized to be placed in the receptacle 27. The cross-sectional size of the receptacle 27 is larger than the magnet 30 such that the magnet rows 32 are positioned in proximity to the interior of the receptacle 27 without contacting the interior. This reduces the amount of force required from the one or more motors 60 to rotate the magnet 30. The receptacle 27 is also constructed and sized such that the magnetic fields F produced by the magnet rows 32 emanate outward from the outer wall 28 of the receptacle 27 and attract the ferromagnetic materials. The cross-sectional shape of the body 31 may match that of the receptacle 27.

Figure 8:
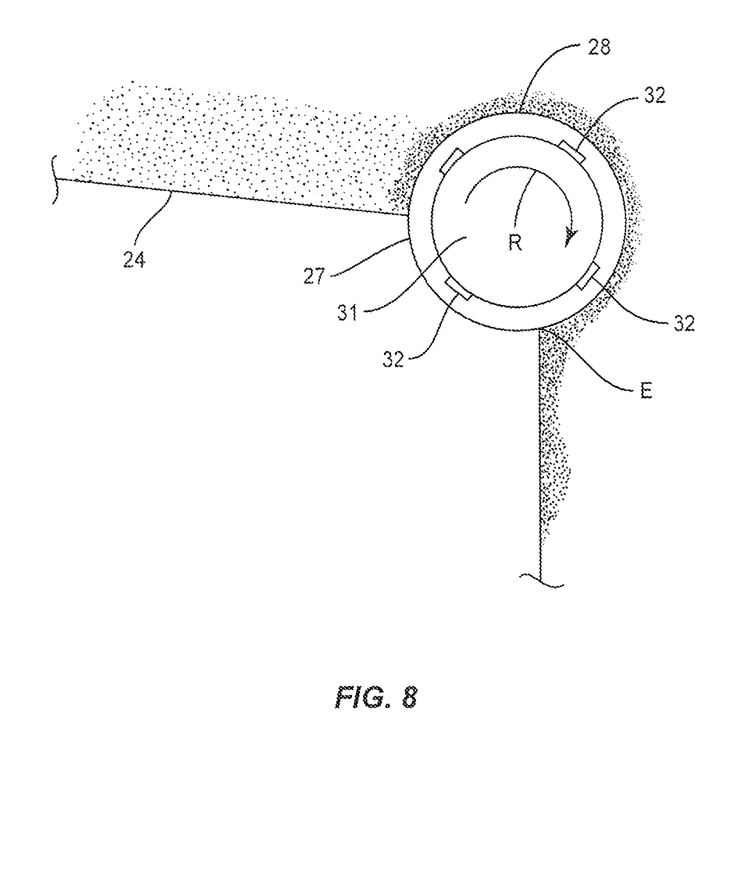
FIG. 8 is a schematic side view of a magnet and attracted ferromagnetic material.

FIG. 8 illustrates the device 10 in operation to remove the ferromagnetic materials from the liquid. In this embodiment, the magnet 30 is positioned within the receptacle 27 and is rotated by a motor 60 (not illustrated in FIG. 8) in the direction of arrow R. As the liquid with the ferromagnetic materials move in proximity of the magnet 30, the magnetic fields from the magnetic rows 32 attract the materials. This pulls the materials from the liquid such that the materials accumulate against the exterior of the outer wall 28 of the receptacle 27. As the magnet 30 continues to rotate, the accumulated materials move along the outer wall 28 with one of the magnet rows 32 to which it is attracted. The materials move around the exterior of the receptacle 27 until reaching the intersection E between the outer wall 28 of the receptacle 27 and a wall of the collection basin 23. As the magnet 30 continues to rotate, the magnet row 32 moves away from point E. At a certain amount of rotation, the magnetic row 32 moves a distance such that its magnetic field F no longer attracts the materials. Once the materials are beyond the magnetic field F of the magnet row 32, the materials fall away from the receptacle 27 and into the collection basin 23 due to gravity. Because of the spacing between the magnet rows 32, the materials are able to fall away from the receptacle 27 without being attracted to the next row 32.

During rotation of the magnet 30, each of the rows 32 face towards the channel for a limited time. The remainder of the time the individual rows face away from the channel.

The materials accumulate in the collection basin 23 and can be removed as necessary. The liquid with the material now removed moves through the container 20 and eventually exits through the outlet 22.

In one or more embodiments as illustrated in FIG. 4, the device 10 does not include a plate 40.

The receptacle 27 is configured to provide straight-forward access to the magnet 30. A user is able to access the magnet 30 and to remove and replace the magnet 30 as needed.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device to remove ferromagnetic particles from a liquid, the device comprising:
    a container to hold the liquid as the liquid moves in a horizontal downstream direction through the container, the container comprising a channel with a floor and a collection basin, the collection basin having a bottom positioned vertically below the floor, the floor comprising a first section located upstream from the collection basin and a second section located downstream from the collection basin; and
    a magnet positioned along the first section and vertically above the bottom of the collection basin, the magnet comprising a body that extends across the channel and having a plurality of magnet rows that extend along the body and are spaced apart around a periphery of the body, the magnet being isolated from the ferromagnetic particles by the floor of the first section;
    the body being rotatable relative to the floor of the first section such that each of the magnet rows faces towards the channel for a limited time during a full rotation of the body.

2. The device of claim 1, further comprising a receptacle positioned along the first section and comprising an interior space that houses the magnet, the receptacle positioned vertically above the bottom of the collection basin.

3. The device of claim 2, wherein the receptacle extends completely around and encloses the magnet.

4. The device of claim 2, wherein the floor of the first section is formed by a first portion that extends inward from an inlet and a wall of the receptacle.

5. The device of claim 1, wherein the body vertically overlaps with the bottom of the collection basin.

6. The device of claim 1, further comprising a motor operatively connected to the magnet to rotate the magnet.

7. The device of claim 1, wherein the plurality of magnet rows extend along an entirety of the length of the body.

8. The device of claim 1, further comprising a baffle positioned downstream along the channel from the collection basin, the baffle extending vertically above the floor of the second section.

9. The device of claim 1, wherein the container further comprises an inlet upstream from the first section, and a plate that extends along the first section is positioned vertically above the inlet and the floor of the first section.

10. The device of claim 1, wherein a downstream edge of the magnet is positioned at the collection basin such that the ferromagnetic particles attracted to the magnet fall into the collection basin during rotation of the magnet.

11. A device to remove ferromagnetic particles from a liquid, the device comprising:
    a container to hold the liquid as the liquid moves in a horizontal downstream direction through the container, the container comprising a collection basin with a bottom, the container also comprising a first section located horizontally upstream from the collection basin, a second section located horizontally downstream from the collection basin, and an attraction zone located horizontally between the first section and the collection basin, each of the first section, the second section, and the attraction zone including floors that are vertically above the bottom of the collection basin;
    a magnet positioned at the attraction zone and vertically above the bottom of the collection basin, the magnet comprising a body with a plurality of magnet rows that extend along the body and are spaced apart around a periphery of the body, the magnet being isolated from the ferromagnetic particles by a wall, the magnet being rotatable such that each of the magnet rows faces towards the channel for a limited time during a full rotation of the body;
    a downstream edge of the magnet being positioned at the collection basin such that the ferromagnetic particles on the wall fall into the collection basin during rotation of the magnet.

12. The device of claim 11, further comprising a receptacle with an interior space that houses the magnet with the wall forming a portion of a receptacle.

13. The device of claim 11, wherein the collection basin comprises upstream and downstream sidewalls that are horizontally spaced apart with the downstream edge of the magnet positioned horizontally between the upstream and downstream sidewalls.

14. The device of claim 11, wherein at least a portion of the floor of the attraction zone is vertically above the floor of the first section.

15. A method of removing ferromagnetic particles from a liquid, the method comprising:
    moving the liquid with the ferromagnetic particles along a channel of a container;
    while the liquid and the ferromagnetic particles are moving along the channel, magnetically attracting the ferromagnetic particles towards a magnet and against a wall that separates the magnet from the channel;
    moving the magnet causing the ferromagnetic particles that are magnetically attracted to the magnet to follow the magnet and move along the wall and vertically over a collection basin; and
    moving the magnet away from the ferromagnetic particles and removing the magnetic attraction between the magnet and the ferromagnetic particles thereby causing the ferromagnetic particles to vertically fall into the collection basin.

16. The method of claim 15, further comprising magnetically attracting the ferromagnetic particles towards a bottom of the channel.

17. The method of claim 15, further comprising preventing the ferromagnetic materials from directly contacting the magnet.

18. The method of claim 15, wherein moving the magnet comprises rotating the magnet.

19. The method of claim 15, further comprising moving the liquid along the channel while the ferromagnetic materials are being magnetically attracted towards the magnet and while the ferromagnetic particles are vertically falling into the collection basin.

* * * * *